United States Patent [11] 3,619,135

[72] Inventor Alexander F. MacLean
 Durham, N.H.
[21] Appl. No. 795,031
[22] Filed Jan. 29, 1969
[45] Patented Nov. 9, 1971
[73] Assignee Celanese Corporation
 New York, N.Y.
 Continuation-in-part of application Ser. No.
 333,751, Dec. 26, 1967, now abandoned.

[54] PROCESS FOR GENERATING HYDROCARBON
 FREE RADICALS FROM CARBOXYLIC ACIDS AS
 TERTIARY ALCOHOLS
 19 Claims, No Drawings
[52] U.S. Cl. ................................................ 23/151,
 260/465.3, 260/483, 260/526 R, 260/540,
 260/593 R, 260/652, 260/676 R, 260/681,
 260/682
[51] Int. Cl. .................................................. C01c 3/00,
 C07c 121/18, C07c 9/06
[50] Field of Search ............................................ 23/151, 75;
 260/593 R, 595, 596, 465.3, 652, 483, 526 R, 540,
 676 R, 681, 682

[56] References Cited
 UNITED STATES PATENTS
2,647,920  8/1953  Patrick, Jr. et al. ............ 260/483
2,802,020  8/1957  Fierce et al. ..................... 23/151
2,818,441  12/1957  Vaughan et al. ................ 260/632
2,883,426  4/1959  Brackman ........................ 260/596
3,110,722  11/1963  Brackman ........................ 260/464
3,347,643  10/1967  Nielsen ............................ 23/357

OTHER REFERENCES
 Kirk-Othmer, "Encyclopedia of Chemical Technology,"
Vol. 10, pg. 38, pp. 47-48 (1953) TP9E68

Primary Examiner—Oscar R. Vertiz
Assistant Examiner—Hoke S. Miller
Attorneys—Marvin Turken, Stewart N. Rice and Ralph M. Pritchett ABSTRACT: Certain organic reactants which are free from aliphatic unsaturation and which are capable of yielding free radicals upon treatment with peroxides are oxidized, in the liquid phase in an aqueous medium, with certain peroxy compounds to form free-radical intermediates which are then allowed to react further with themselves or with other components of the reaction medium to form useful end products. Preferred features include the slow addition of the peroxy compound to the reaction zone and the use of certain metalic ions to improve yields. The process may be used for the reaction of HCN and carboxylic acids to produce nitriles; the conversion of tertiary alkanols to ketones; and the production of cyanogen from hydrogen cyanide.

PROCESS FOR GENERATING HYDROCARBON FREE RADICALS FROM CARBOXYLIC ACIDS AS TERTIARY ALCOHOLS

This is a continuation-in-part of application Ser. No. 33,751, filed Dec. 26, 1963 and now abandoned.

This invention relates broadly to a method of effecting a chemical reaction. The invention is especially concerned with certain new and useful improvements in a method of synthesizing organic compounds by a chemical reaction involving reactable material, including essentially at least one organic reactant, more particularly a tertiary alcohol, an organic acid, a salt of an organic acid, or a combination of such an acid and a salt in any proportions. The organic reactant is further characterized by the fact that it is free from aliphatic unsaturation, and is capable of yielding free organic radicals, more particularly hydrocarbon radicals, under free-radical forming conditions.

One embodiment of the present invention comprises evolving free organic radicals, e.g., hydrocarbon radicals, from organic-reactant material of the kind above-described by oxidizing the latter under free radical-forming conditions in an aqueous or aqueous-organic solvent medium with an inorganic peroxy compound, more particularly an inorganic peroxy acid (inorganic peroxide) or its salt wherein the reaction is carried out by "slow addition" of the peroxy compound, such that the peroxy concentration never exceeds one-third the concentration which would be obtained by batchwise addition of all the peroxy compound, determined by iodometric titration of a sample.

The inorganic peroxy compounds found to be useful are those which may be represented by the general formula $A \cdot O \cdot O \cdot A'$ where $A$ and $A'$ may be the same or different and each represents a member of the group consisting of $(HO)_2PO\cdot$, $HO\cdot(CO)\cdot$, $HO\cdot(SO_2)\cdot$, but not H; and salts of the peroxides embraced by the aforementioned formulas, especially those which are at least partly soluble in water or in a mixture or water and an organic solvent. More specific examples of such inorganic persalts are, for instance, the alkali-metal and ammonium persulfates, percarbonates and perphosphates. Peroxides (or their salts) of organic carboxylic acids and hydrogen peroxide are not satisfactory for use in practicing the present invention.

In accordance with another aspect of the invention, the oxidation to free radicals can be effected in the presence of a salt, such as silver salt, to catalyze the formation of the radical and improve the yield of desired products and in the presence of other salts, such as a copper salt, to promote a specific reaction of the free radical so released.

Using the methods of this invention, it has been found that acetic acid is oxidized to carbon dioxide plus methane, ethane, and methyl acetate by potassium persulfate. In the presence of hydrogen cyanide, acetonitrile is obtained.

Another example is the oxidation of propionic acid to carbon dioxide plus butane, ethane, ethylene, propionitrile, ethyl chloride and ethanol.

All of the products obtained by persulfate oxidation can be explained on the basis that the carboxylic acid is oxidized to a free radical and on the reactions of such free radicals.

In the method of this invention carboxylic acids and tertiary alcohols, for example, are oxidized to free radicals by peroxides such as potassium persulfate. The persulfate ion oxidizes the organic acid, or its ion to a free radical intermediate; 1, 2.

1. $S_2O_8^= \rightarrow 2 SO_4^-$

2. $SO_4^- + RCO O \rightarrow RCO O\cdot + SO_4^=$

The organic intermediate free radical $RCOO\cdot$ is not stable and decomposes as in equation 3.   3. $RCOO\cdot \rightarrow R\cdot + CO_2$.

When the persulfate is added batchwise to the carboxylic acid or its salt yields of desired products were low but when it was added slowly the yields were much increased. The slow addition was done so that the persulfate reacted as it was added and its concentration in the reaction mixtures never exceeded one-third the concentration which would have resulted from batch mixing.

Operating at increased temperature or in the presence of $Ag^+$ ions with slow addition of persulfate also increases the yield because they increase the relative rate of $S_2O_8$ decomposition and cause it to be maintained at a lower steady state concentration. Silver introduces a chain reaction involving the reduction of $S_2O_8$ shown in equations 4 and 5. 4. $S_2O_8^= + Ag^+ \rightarrow S_2O_8 + Ag^{++}$ 5. $Ag^{++} + R \cdot COO^- \rightarrow RCOO\cdot + Ag^+$ The $SO_4$ still reacts by equation 3 so the stoichiometry and products are not changed by the addition of $Ag^+$. It might be reasoned that the $Ag^{++}$ from equation 4 would oxidize $R\cdot$ from equation 3. This reaction does not appear to proceed despite the high oxidation potential of $Ag^{2+}$. It is known that ions, such as $Cu^{2+}$ with much lower oxidation potentials will oxidize $R\cdot$.

The radicals $R\cdot$ generated by the slow addition of persulfate react in the ways anticipated. Alkyl radicals disproportionate, condense or abstract hydrogen. The course depends on the nature of the radical, their steady state concentration or the presence or absence of abstractable hydrogen atoms. The reactions are illustrated by equations 6, 7 and 8. 6. $2R\cdot CH_2\cdot h_2\cdot \rightarrow R\cdot CH_2\cdot CH_3 + R\cdot CH:CH_2$ 7. $2R\cdot CH_2\cdot CH_2\cdot \rightarrow (R\cdot CH_2 a 1CH_2\cdot)_2$ 8. $R\cdot CH_2\cdot CH_2\cdot + R'\cdot H \rightarrow R\cdot CH_2\cdot CH_3 + R'\cdot$ If a large excess of acetic acid were used, for instance, $CH_3\cdot$ radicals would be the primary products. These would react with the excess of acetic acid to yield succinic acid. These reactions are shown in equations 9, 10, and 11. 9. $CH_3\cdot COO\cdot \rightarrow CH_3\cdot + CO_2$ 10. $CH_3\cdot + CH_3\cdot COOH \rightarrow CH_2COOH + CH_4$ 11. $2\cdot CH_2COOH \rightarrow HOOC\cdot CH_2\cdot CH_2COOH$ If the concentration of acetic were low ethane would be the main product. 12. $2\cdot CH_3 \rightarrow CH_3\cdot CH_3$ In the presence of certain metal salts the radicals are oxidized. For instance acetic acid oxidized in the presence of cupric acetate will yield methyl acetate by oxidation of the methyl radical.

13. 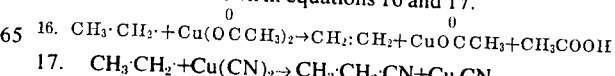

The $CuOOC\cdot CH_3$ from 13 is oxidized back to $Cu\,(OOCCH_3)_2$ by persulfate and the $SO_4^-$ produced in this step introduces the new chain reaction as in equation 14.

14. $CuOC\,CH_3 + S_2O_8^= + CH_3CO\cdot \rightarrow SO_4^- + SO_4^= + Cu(OC\,CH_3)_2$ Methyl radicals will react with other cupric salts. Cupric chloride yields methyl chloride and cupric cyanide yields acetonitrile.

Methyl radicals contain no alpha carbon hydrogen atoms so their reactions are least complex. Ethyl radicals made by the oxidation of propionic acid can undergo disproportionation and ionic deprotonation so their reactions are more complex. The disproportionation of ethyl radicals yields ethane and ethylene. 15 $CH_3\cdot CH_2\cdot \rightarrow CH_3\cdot CH_3 + CH_2:CH_2$ Ethyl radicals in the presence of cupric salts can undergo deprotonation or radical substitution depending on the salt ligand. Cupric acetate yields ethylene and cupric cyanide yields propionitrile. The reactions are shown in equations 16 and 17.

16. 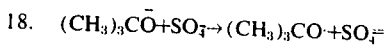

17. $CH_3\cdot CH_2\cdot + Cu(CN)_2 \rightarrow CH_3\cdot CH_2\cdot CN + Cu\,CN$ Tertiary alcohols on oxidation of the alcohol give an oxy radical precursor which will decompose to a ketone and a free radical. Tertiary butanol yielded acetone and methane and probably a tetra methyl butyene glycol. These reactions are illustrated by equations 18, 19, 20 and 21.

18. $(CH_3)_3C\bar{O} + SO_4^- \rightarrow (CH_3)_3CO\cdot + SO_4^=$

19. $(CH_3)_3\cdot CO \rightarrow CH_3\cdot CO\cdot CH_3 + CH_3\cdot$

20.

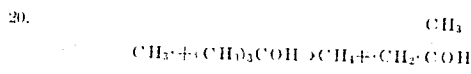

21.

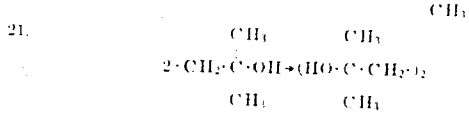

The overall stoichiometry of the various reactions is shown below.

Radical Condensation 22.   2 RCOOH+$K_2S_2O_8$ → $R_2$+2$CO_2$+2$KHSO_4$

Hydrogen Abstraction 23.   2ROOCH+2H$CY_3$+$K_2S_2O_8$ → 2 RH+2$CO_2$+2$KHSO_4$+2·$CY_3$ Radical Disproportionation (for $CH_3$·$CH_2$COOH)

24.   2$CH_3$·$CH_2$·COOH+$K_2S_2O_8$ → $CH_2$:$CH_2$+$CH_3$·$CH_3$+2$CO_2$+2$KSO_4$

Radical Substitution

25.   R·COOH+HX+$K_2S_2O_8\overrightarrow{Cu^+}$R·X+$CO_2$+2$KHSO_4$

Radical Deprotonation

26.   $CH_3$·$CH_2$·COOH+$K_2S_2O_8\overrightarrow{Cu^{++}}CH_2$:$CH_2$+$CO_2$+2$KHSO_4$ Radical substitution was observed with cyanide salts in lower yields. In the absence of cupric salts nitrile radicals were probably mad in low yields and these combined directly with the radicals from the carboxylic acid. In the case of acetic acid this reaction would be 27 and 28.

27.   $SO_4$+$CN^1$ → $SO_4^=$+·CN
28.   ·CN+$CH_3$ → ·$CH_3$CN

When a copper is present a complex is favored between this radical and the salt and will decompose by deprotonation depending on the radical attached to the copper.

29-A   R·+Cu$L_2$→RCu$L_2$ $\xrightarrow{\text{deprotonate}}$ R(olefin)+CuL+HL

29-B   $\xrightarrow[\text{substitute}]{}$ R·L+CuL

From the foregoing, it will be seen that the present invention provides a new and unobvious method of producing a great variety of organic compounds. For example, by reaction equation (25) when X=CN a series of nitrile compounds such as acetonitrile, benzonitrile, or valeronitrille can be made. Chlorides and alcohols can also be made when X=Cl or X=OH. Under certain conditions, esters can be made where X=R·COOO. Another example is the generation of vinyl olefins by reaction (26). Thus, heptanoic acid would yield hexene-1, and cyclo-hexane carboxylic acid would yield cyclohexene.

Illustrative examples of organic acids (or salts thereof) that may be used in practicing the present invention are the various straight- or branched-chain monobasic acids, more particularly monocarboxylic acids, and especially the saturated aliphatic and the aromatic monocarboxylic acids such, for example, as those represented by the general formula R-COOH, where R represents a hydrocarbyl radical, more particularly a saturated aliphatic (including cycloaliphatic) or aromatic hydrocarbon radical, e.g. methyl through octadecyl, cyclohexyl, cycloheptyl, phenyl, tolyl, benzyl, phenylethyl and others. Examples of such acids are the $C_1$ through $C_{18}$ monocarboxylic acids, both straight- and branched-chain. Polybasic acids, more particularly polycarboxylic acids, also may be employed. Examples of such acids include malonic, succinic, glutaric, adipic, pimelic, suberic, sebacic, tricarboxyklic, and others wherein the carboxylic groups are attached directly to a saturated aliphatic or aromatic hydrocarbon residue. In some cases it may be desirable to use an anhydride of a mono- or polycarboxylic acid instead of part or all of such an acid.

Salts of organic acids may be used in place of or in addition to the acid and/or anhydride itself. The salts employed are preferably those which are at least partly soluble in water and will ionize in water. The cation of such salts may be, for instance, any of the alkali metals, barium, strontium, calcium, magnesium, copper, nickel, silver and others that form salts with a carboxylic acid that are at least partly soluble in water.

Instead of using a single organic acid and a single organic salt one can use a plurality of organic acids and/or a plurality of the same or different salts of said acids.

As indicated hereinbefore, a tertiary alcohol can be used as an organic reactant in practicing the present invention. Thus one may use a tertiary-alkanol such as tertiary-butanol. Such alkanols, which can be oxidized to hydrocarbon radicals, may be represented by the general formula

where R, R' and R" are the same or different alkyl radicals. Preferably the various R's represent a lower alkyl radical, more particularly methyl through hexyl. Thus each of the various R's can be a methyl radical and the formula then becomes that of tertiary-butanol which evolves methyl radicals upon oxidation in accordance with this invention. Of course it will be understood by those skilled in the art that the various R's in the above formula may be an alkyl radical higher than $C_6$ radicals, e.g., up to $C_{18}$ or $C_{20}$ or even higher radicals, depending upon such considerations as availability or ease of manufacture, and the particular end-products desired.

Taking chloroacetic acid and succinic acid as illustrative of the organic acids employed, the free or initiating radicals that are evolved are Cl$CH_2$· and ·$CH_2$·$CH_2$COOH, respectively. Other examples will be apparent to those skilled in the art from the examples of starting reactants given hereinbefore and in the examples that follow.

CONDITIONS OF REACTION

The reaction is effected in an aqueous reaction medium, e.g., water alone or a mixture of water and an organic solvent which is miscible with water or at least partly soluble in water, e.g., acetonitrile, dioxane, or acetone or water mixed with the acid being oxidized. Preferably water alone is used. In general, the reaction will proceed at a satisfactory rate below the boiling point of the aqueous solution, and the reaction temperature can be decreased further in the presence of silver, copper or other catalyst salts. The reaction medium may constitute, for instance, from about an equal part by weight of the reactants to about 50 times their weight, or even higher, as desired or as conditions may require.

Tee temperature of the reaction may be varied, for example, from about ambient temperature (20°-30° C.), preferably at least about 40° C., to about 100° C. The use of higher temperatures, is, of course, not precluded. This may be desirable when using more stable peroxides or to obtain low reaction time.

The peroxide is added continuously to the other reactants at such a rate that the steady state concentration of the peroxide remains at a value less than one-third that which would result from batch mixing advantages were observed for slow addition of the peroxide to the organic compound to be oxidized over batch addition.

The molar ratios of reactants may be varied considerably. Usually the ratios are such that the proportion of organic reactant, (e.g., organic acid and/or salt thereof) to peroxy compound used in practicing this invention is within the range of, for example, about 1 to 50 moles of the former per mole of the latter. When an additional reactant or reactants are included with those just named, e.g., a nitrile, it is generally employed in an amount which is in a mole ratio in excess of the peroxide from 1 to 10.

As indicated hereinbefore, the oxidation reactions with which this invention is concerned can be effected in the presence or absence of a catalyst for the reaction, more particularly a catalyst comprising at least one metallic ion. The amount of such catalyst may range from a trace up to, for example, 10 mole percent of the molar amount of the other active reactants employed. The use of larger molar amounts is not precluded.

Illustrative examples of salts that may be employed to introduce the indicated ions, and which generally were used in the examples that follow, are shown below:

| SALT | ION |
| --- | --- |
| $Ag_2CO_3$ (Silver carbonate) | $Ag^+$ |
| $Cu(OAc)_2 \cdot H_2O$ (Cupric Acetate) | $Cu^{++}$ |
| $Co(OAc)_2 \cdot H_2O$ (Cobaltous Acetate) | $Co^{++}$ |
| $Ni(OAc)_2 \cdot H_2O$ (Nickelous acetate) | $Ni^{++}$ |
| $Hg(OAc)_2$ (Mercuric acetate) | $Hg^{++}$ |
| $H_2PtCl_6 \cdot 6H_2O$ (Chloroplatinic acid) | $PtCl_6$ |
| $Ce_2(CO_3)_3 \cdot 5H_2O$ (Cerrous carbonate) | $Ce^{+++}$ |
| $Ce(SO_4)_3$ (Cerric sulfate) | $Ce^{++++}$ |
| $Cr(OAc)_3$ (Chromic acetate) plus $H_2O$ | $Cr^{+++}$ |

Similarly other ions, e.g., iron and manganese ions, as well as other ions may be introduced into the reaction mass. Salts other than the particular salts of the metals just mentioned may be employed.

In order that those skilled in the art may better understand how the present invention can be carried into effect, the following examples are given by way of illustration and not by way of limitation. All parts and percentages are by weight unless otherwise stated.

The runs of table I of example I, run II–A of table II, and run III–A of table III were made as follows. In batch tests the amounts of reactants shown were charged to a jacketed reactor. The reaction temperature was controlled by refluxing a liquid, which boiled at the desired reaction temperature, in the reactor jacket. (Benzene was the refluxing liquid in the runs of example I to maintain a reaction temperature of 80° C.; and acetone in example III–A to maintain a reaction temperature of 56° C.) The free space of the reactor was kept low to prevent dilution of the gas sample. The gas was passed through a sampling tube to a leveling gas receiver to prevent pressure buildup. The liquid in the leveling tube was saturated aqueous $MgSO_4$. The gas was analyzed by mass spectrography.

In the foregoing and most of the other runs that were made, the amounts of liquid product were, in general, not determined because of their low concentration.

The runs where the liquid volume exceeded 120 CC. were made as follows. The reactor was a flask of suitable volume equipped with a thermometer, dropping funnel and reflux condenser. The flask was charged with the starting ingredients, more particularly in these runs with water, acetic acid and/or sodium acetate, HCN (in some runs) and, in most runs, a catalyst or combination of catalysts. The reaction mixture was heated to about 98° C., and 100 cc. of aqueous 0.2 M potassium persulfate was added. In those marked "slow add'n." it was added at a fairly constant rate over a period of 30 minutes. In those marked "batch", all the potassium persulfate solution was added initially to the reactor with the other ingredients. the liquid product was analyzed by gas-liquid partition chromatography immediately after the run.

Example 1

This example is not within the scope of the invention and is included for comparison. It shows the products obtained by the decomposition of potassium persulfate in the presence or absence of acetic acid or sodium acetate with batch addition of the persulfate. The notation "½" under "time" refers to amount of time necessary for one-half of the peroxy compound to react, measured by the total amount of gas given off.

TABLE 1

| Example | I–A | I–B | I–C | I–D | I–E |
| --- | --- | --- | --- | --- | --- |
| Reactants, moles: | | | | | |
| $K_2S_2O_8$ | 0.02 | 0.02 | 0.02 | 0.02 | 0.02 |
| $H_2O$ | 5.5 | 5.5 | 5.5 | 5.5 | 5.5 |
| KOH | | 0.08 | | | |
| $KHCO_3$ | | | 0.08 | | |
| AcOH | | | | 0.10 | |
| AcONa | | | | | 0.06 |
| Time, minutes | ½=138 | ½=128 | ½=133 | ½=46 | ½=42 |
| Temperature, °C. | 80 | 80 | 80 | 80 | 80 |
| Cc. of solution | 100 | 100 | 100 | 100 | 110 |
| pH of product | 1.0 | 13.0 | 7.7 | 0.8 | 4.7 |
| Batch or slow addition | Batch | Batch | Batch | Batch | Batch |
| Products, moles/mole $K_2S_2O_8$: | | | | | |
| $O_2$ | 0.50 | 0.50 | 0.50 | | |
| $CH_4$ | | | | 0.50 | 0.540 |
| $CO_2$ | | | | 0.50 | 1.335 |
| $C_2H_6$ | | | | | 0.065 |

Examples I–A to I–C show that potassium persulfate decomposes quantitatively to oxygen at 80° C. over the pH range of 1.0 to 13.0 at a rate corresponding to a one-half time of about 133 minutes. The one-half time is decreased by the addition of acetic acid on sodium acetate to about 40 min. Examples I–A and I–E.

EXAMPLE II

This example shows the effect of silver catalysis on the yield of methyl radicals and the effect of slow addition of potassium persulfate as compared to the batch reaction.

Table II

| Example | II–A | II–B | II–C |
| --- | --- | --- | --- |
| Reactants, moles | | | |
| $K_2S_2O_8$ | 0.02 | 0.10 | 0.10 |
| AcOH | 0.10 | 4.0 | 3.9 |
| $H_2O$ | 5.5 | 10.0 | 15.0 |
| AcONa | | | 0.20 |
| Catalyst, mole | | | |
| $Ag^+$ | 0.0005 | 0.011 | 0.011 |
| Time, min. | ½=31 | 60 | 160 |
| temp., °C. | 58 | 100 | 100 |
| cc. of Solution | 110 | 450 | 500 |
| pH of Product | 0.9 | | |
| Batch or Slow Add'n. | Batch | Slow | Slow |
| Products, mole/mole $K_2S_2O_8$ | | | |
| $CH_4$ | 0.535 | 1.640 | 1.32 |
| $CO_2$ | 1.185 | 2.00 | 1.60 |
| $C_2H_6$ | 0.085 | 0.002 | 0.06 |
| $(CH_2COOH)_2$ | | 0.10 | |

Example II–A shows that silver ions promote the oxidation of acetic acid to methyl radicals and lower the reaction temperature from 80° to 31° C. (see example I–D for comparison). Presumably, the persulfate oxidizes the silver and this oxidizes the acetate ion (equations 4 and 5 Example II–B shows that the yield of methyl radicals and their products in the presence of silver ions is increased significantly by the slow addition of potassium persulfate to acetic acid at 100° C. as compared to the batch addition at 31° C. Although the methane yield is over double, the ethane yield declined. This was caused by the lower steady state concentration of the methyl radicals which tended to reduce condensation to ethane (equation 12) and reaction with the persulfate ion. Example II–C shows that the presence of added sodium acetate in acetic acid causes a decrease in the methyl radical yield when $Ag^+$ ions are present. The sodium acetate would increase the pH. THis would decrease the activity of silver as a persulfate decomposition catalyst and thereby decrease the catalytic effect of silver.

EXAMPLE III

This example shows the effect of cupric ions on methyl radicals.

TABLE III

| Example | III–A | III–B | III–C | III–D | III–E |
| --- | --- | --- | --- | --- | --- |
| Reactants, moles: | | | | | |
| $K_2S_2O_8$ | 0.02 | 0.02 | 0.02 | 0.02 | 0.02 |
| AcONa | 0.12 | 0.05 | 0.05 | 0.05 | 0.05 |
| $H_2O$ | 5.5 | 5.5 | 5.5 | 5.5 | 5.5 |
| AcOH | | 0.05 | 0.05 | 0.05 | 0.05 |
| Catalyst, moles $Cu^{++}$ | 0.0015 | | 0.000004 | 0.00002 | 0.0002 |
| Time, minutes | ½=7 | 30 | 30 | 30 | 30 |
| Temperature, °C. | 75 | 100 | 100 | 100 | 100 |
| Cc. of solution | 110 | 110 | 110 | 110 | 110 |
| Batch or slow addition | Batch | (¹) | (¹) | (¹) | (¹) |
| Products, moles/mole $K_2S_2O_8$: | | | | | |
| $CH_4$ | 0.015 | 0.73 | 0.223 | 0.053 | 0.00 |
| $C_2H_6$ | 0.000 | 0.073 | 0.018 | 0.006 | 0.00 |
| $CO_2$ | 0.915 | 1.65 | 1.04 | 0.94 | 0.86 |
| $CH_3OAc$ | 0.040 | 0.066 | 0.51 | 0.64 | 0.75 |

¹ Slow addition.

TABLE V

| Example | V-A | V-B | V-C | V-D | V-E | V-F |
|---|---|---|---|---|---|---|
| Reactants, moles: | | | | | | |
| $K_2S_2O_8$ | 0.02 | 0.02 | 0.02 | 0.02 | 0.02 | 0.02 |
| AcONa | 0.05 | 0.05 | 0.05 | 0.05 | 0.05 | 0.05 |
| AcOH | 0.10 | 0.10 | 0.10 | 0.10 | 0.10 | 0.10 |
| HCN | 0.04 | 0.04 | 0.04 | 0.04 | 0.04 | 0.04 |
| $H_2O$ | 9.5 | 9.5 | 9.5 | 9.5 | 9.5 | 9.5 |
| Catalysts, moles | $Co^{++}$ | $Ni^{++}$ | $Hg^{++}$ | $PtCl_6^-$ | $Ce^{+++}$ | (1) |
|  | 0.01 | 0.0004 | 0.00025 | 0.0003 | 0.0004 |  |
| Time, minutes | 30 | 30 | 30 | 30 | 30 | 30 |
| Temperature, °C | 100 | 100 | 100 | 100 | 100 | 100 |
| Cc. of solution | 175 | 175 | 175 | 175 | 175 | 175 |
| Batch or slow addition | (2) | (2) | (2) | (2) | (2) | (2) |
| Products, mole/mole $K_2S_2O_8$: | | | | | | |
| $CO_2$ | 1.635 | 0.84 | 1.605 | 1.546 | 1.130 | 0.875 |
| $CH_4$ | 0.575 | 0.135 | 0.15 | 0.575 | 0.280 | 0.220 |
| $C_2H_6$ | 0.00 | 0.00 | 0.00 | 0.00 | 0.00 | 0.00 |
| $(CN)_2$ | 0.020 | 0.055 | 0.345 | 0.20 | 0.055 | 0.095 |
| $CH_3CN$ | 0.165 | 0.265 | 0.19 | 0.22 | 0.365 | 0.675 |
| $CH_3OAc$ | 0.010 | 0.010 | 0.015 | 0.020 | 0.020 | 0.006 |

[1] $Cu^{++}$ 0.000004, $Ag^+$ 0.0007.
[2] Slow addition.

Example II–A shows that the batchwise decomposition of potassium in the presence of acetic acid is accelerated by copper salts. It caused the one-half time to decrease from 42 minutes at 80° C. to 7 minutes at 75° C. (see example I–E for comparison). Copper enters into a cycle of oxidation and reduction reactions which increase the rate (equations 13, 14, 1, 2, and 3). Examples III–B to III–E show the effect of increasing amounts of copper ions on the formation of methyl acetate, presumably through the methyl carbonium-copper acetate complex intermediate.

The limiting yield of carbon dioxide and methyl acetate when these are the only products is 1.0 mole per mole of potassium persulfate (equation 25) where $R=CH_3$ and $X=CH_3 \cdot oo$. EXAMPLE IV This example shows that mixtures of acetic acid, hydrogen cyanide and their salts are oxidized to a mixture of cyanogen, ethane, acetonitrile, and methyl acetate.

TABLE IV

| Example | IV-A | IV-B |
|---|---|---|
| Reactants, moles | | |
| $K_2S_2O_8$ | 0.02 | 0.02 |
| AcONA | 0.05 | 0.10 |
| AcOH | 0.10 | 0.10 |
| HCH | 0.04 | 0.04 |
| $H_2O$ | 9.5 | 9.5 |
| Catalyst, moles | | |
| $Cu^{++}$ |  | 0.000004 |
| Time, min. | 30 | 30 |
| Temperature, °C | 100 | 100 |
| cc. of Solution | 180 | 180 |
| Batch or Slow Add'n. | Slow Add'n. | Slow Add'n. |
| Products, mole/mole $K_2S_2O_8$ | | |
| $CO_2$ | 1.76 | 1.11 |
| $CH_4$ | 0.72 | 0.18 |
| $C_2H_6$ | 0.00 | 0.00 |
| $(CN)_2$ | 0.02 | 0.080 |
| $CH_3CN$ | 0.135 | 0.64 |
| $CH_3OAc$ | 0.010 | 0.030 |

Example IV–A shows that, in the absence of a catalyst, lower yields are obtained, probably by combination of free nitrile and methyl radicals. Example IV–B shows the yields of acetonitrile, cyanogen and methyl acetate are all increased by copper. The acetonitrile is presumably formed through the methyl carbonium-copper

EXAMPLE V

This example shows that sodium acetate and hydrogen cyanide are oxidized to cyanogen plus acetonitrile by the slow addition of potassium persulfate. The yield is increased to varying degrees by the addition of various ions. Copper is the most effective catalyst. Sodium acetate plus acetic acid is preferably to acetic acid alone.

The catalysts and the percent of theoretical acetonitrile yield are;

| Catalyst | % yield |
|---|---|
| No Catalyst | 13.5 |
| $Co^{++}$ | 16.5 |
| $Hg^{++}$ | 19.0 |
| $Pt^{++}$ | 22.8 |
| $Ni^{++}$ |  |
| $Ce^{+++}$ | 36.5 |
| $Cu^{++}$ | 64.0 |

EXAMPLE VI

This example shows the products obtained from ethyl radicals.

TABLE VI

| Example | VI-A | VI-B | VI-C | VI-D | VI-E | VI-F | VI-G |
|---|---|---|---|---|---|---|---|
| Reactants, moles: | | | | | | | |
| $K_2S_2O_8$ | 0.02 | 0.02 | 0.02 | 0.02 | 0.02 | 0.020 | 0.020 |
| PrONa | 0.12 |  |  |  | 0.050 | 0.050 |  |
| PrOH | 0.020 | 1.00 | 1.0 | 1.0 | 0.150 | 0.100 | 0.100 |
| $H_2O$ | 5.5 | 7.6 | 7.6 | 7.6 | 10.0 | 10.0 | 10.0 |
| HCN |  |  |  |  | 0.04 | 0.040 | 0.040 |
| NaOH to pH |  |  |  |  |  |  | 4.0 |
| Catalyst, moles: | | | | | | | |
| $Ag^+$ |  |  | 0.007 | 0.007 |  | 0.0007 | 0.0007 |
| $Cu^{++}$ |  |  |  | 0.005 |  |  | 0.000002 |
| Time, minutes | ½=79 | 30 | 30 | 30 | 30 | 30 | 30 |
| Temperature, °C | 80 | 100 | 100 | 100 | 100 | 100 | 100 |
| Cc. of solution | 110 | 200 | 200 | 200 | 200 | 200 | 200 |
| Batch or slow addition | Batch | (1) | (1) | (1) | (1) | (1) | (1) |
| Products, mole/mole $K_2S_2O_8$: | | | | | | | |
| $CH_4$ | 0.000 |  |  |  |  |  |  |
| $C_2H_4$ | 0.140 | 0.00 | 0.01 | 0.56 | 0.000 | 0.000 | 0.036 |
| $C_2H_6$ | 0.450 | 0.02 | 1.46 | 0.14 | 0.005 | 0.315 | 0.173 |
| $C_4H_8$ |  | 0.00 | 0.05 | 0.02 |  |  |  |
| CO |  | 0.01 | 0.02 | 0.09 |  |  |  |
| $CO_2$ | 0.095 | 0.10 | 1.97 | 1.05 | 0.865 | 1.000 | 0.962 |
| $(CN)_2$ |  |  |  |  | 0.025 | 0.035 | 0.021 |
| $C_2H_5CN$ |  |  |  |  | 0.115 | 0.205 | 0.485 |

[1] Slow addition.

Example VI-A shows that sodium propionate is oxidized to ethyl radicals and carbon dioxide. The ethyl radicals abstract hydrogen to yield ethane (equation 8 where R=H) or disproportionate to yield ethane and ethylene (equation 6 where R=H). Example VI-B shows that the yield of carbon dioxide and radicals is much lower when propionic acid is oxidized. Example VI-C shows that when silver ions are present propionic acid is oxidized in high yields to ethyl radicals and carbon dioxide. The yield of ethane is high but ethylene low. The disproportionation reaction (equation 6) to produce ethylene and ethane is low here because the steady state concentration of ethylene is kept at a low steady state by slow addition of the potassium persulfate. Example VI-D shows that in the presence of both copper and silver ions significant yields of ethylene are obtained. In this case the copper ions deprotonate the ethyl radicals to ethylene (equations 16). The limiting yield of ethylene is 1 mole per mole of potassium persulfate (equation 26). Example VI-E shows that when mixtures of sodium cyanide, sodium propionate, and propionic acid are oxidized, some propionitrile is made as well as smaller amounts of ethane and cyanogen. These products are obtained by combination of nitrile and ethyl radicals (equations 27 and 28 where $CH_3 \cdot = C_2H_5 \cdot$). Example VI-F shows that the yields of all the products obtained in VI-E are increased by the addition of silver ions. Silver is presumably a better catalyst for generating nitrile and ethyl radicals ($Ag^{++} + CN^1 \rightarrow Ag^+ + \cdot CN$ and equations 5 and 3). Example VI-G shows that the yield of propionitrile is significantly increased and ethylene is also made by the combined effect of copper and silver over the effect of silver alone. The yields of cyanogen and ethane are decreased. In the presence of copper salts the ethyl radicals deprotonate (equation 29-A, $R=CH_3 \cdot CH_2 \cdot$) or substitute (equation 29-B, $R=CH_3 \cdot CH_2 \cdot$). For copper cyanide the substitution is favored over the deprotonation by ratio of 0.485 with ethyl radicals. The maximum yield of deprotonation by a ratio of 0.485 with ethyl radicals. The maximum yield of deprotonation or substitution products by copper catalysis is 10 mole of $CO_2$ and 1.0 mole radical conversion product for 1.0 mole of peroxide (equation 25 and 26).

EXAMPLE VII

This example shows the products obtained from propyl radicals generated in the presence of various copper salts. It also shows the moles of ethyl radical produced per mole of persulfate reduced, the percent of the ethyl radical going to ethylene or ethyl carbonium ion (these two figures add to 100 percent) and the percent of the ethyl carbonium ion intermediate which deprotonates or substitutes (these two figures add to 100 percent).

TABLE VII

| Example | VII-A | VII-B | VII-C | VII-D | VII-E |
|---|---|---|---|---|---|
| Reactants, moles: | | | | | |
| $K_2S_2O_8$ | 0.020 | 0.020 | 0.020 | 0.020 | 0.020 |
| PrOH | 0.100 | 0.100 | 0.100 | 0.100 | |
| PrONa | | | | | 0.400 |
| NaOH [a] | 0.022 | 0.034 | 0.030 | 0.013 | 0.044 |
| $SO_4^-$ | 0.055 | | | | |
| $HPO_4^-$ | | 0.040 | | | |
| $ClO_4^-$ | | | 0.040 | | |
| $Cl^-$ | | | | 0.040 | |
| $OH^-$ [b] | | | | | 0.063 |
| Catalysts, moles: | | | | | |
| $Cu(OAc)_2$ | 0.000002 | 0.000002 | 0.000002 | 0.000002 | 0.000002 |
| $Ag^+$ | 0.0007 | 0.0007 | 0.0007 | | |
| Time, minutes | 30 | 30 | 30 | 30 | 30 |
| Temperature, °C | 100 | 100 | 100 | 100 | 100 |
| Cc. of solution | 200 | 200 | 200 | 200 | 200 |
| pH | 3.52 | 4.3 | 4.3 | 3.5 | 11.0 |
| Products, mole/mole $K_2S_2O_8$: | | | | | |
| EtOH | 0.0211 | 0.0145 | 0.0099 | 0.0045 | 0.078 |

TABLE VII (Continued)

| Example | VII-A | VII-B | VII-C | VII-D | VII-E |
|---|---|---|---|---|---|
| EtCl | | | | 0.073 | |
| $C_2H_4$ | 0.282 | 0.352 | 0.352 | 0.035 | 0.087 |
| $C_2H_6$ | 0.542 | 0.481 | 0.496 | 0.093 | 0.734 |
| $CO_2$ | 1.46 | 1.45 | 1.34 | 0.384 | |
| n-Butane | 0.0338 | 0.0110 | 0.0368 | | 0.009 |
| Butene | 0.021 | 0.0137 | 0.0215 | | 0.001 |
| Products: | | | | | |
| Et-produced [c] | 0.844 | 0.847 | 0.859 | 0.205 | 0.919 |
| Percent Et· to $C_2H_6$ | 64.1 | 56.7 | 57.8 | 45.2 | 79.8 |
| Percent Et· to Et· | 35.9 | 43.3 | 42.2 | 54.8 | 20.2 |
| Percent Et·+ to EtOH | 6.9 | 4.0 | 2.8 | | 53.0 |
| Percent Et·+ to EtOH+EtCl | | | | 68.7 | |
| Percent Et·+ to $C_2H_4$ | 93.1 | 96.0 | 97.2 | 31.3 | 47.0 |
| Accountability [d] | 65 | 74 | 70 | 16 | 101 | a. This quantity of caustic was added continuously during the runs (as a 1.0 N solution) to maintain the pH at the given value. The pH was maintained constant at this value throughout the run.

b. The hydroxide ion amounts are reported as molar concentrations. These figures were obtained from the following formula:

$$(OH^-) = 10^{pH - 12.2}$$

$10^{-12.2}$ is the ionization constant of water at 100°C.

c. The ethyl radical produced is reported in moles of radical produced per mole of persulfate decomposed. It is based on all the identified products which presumably went through an ethyl radical intermediate (ethane, ethylene ethyl alcohol and ethyl chloride). The figures following describe the fate of the ethyl radicals on a percentage basis (percent abstracting hydrogen to give ethane, percent oxidized to carbonium ions, etc.).

d. The accountability is the amount of persulfate accounted for on the basis of the products formed. For example, in Run VII-A ($EtOH = C_2H_4 + \frac{1}{2}C_2H_6 + $ n-butane $+ 2$ Butene) × 10065.

Abbreviations used in table:

PrOH—Propionic Acid
PrONa—Sodium Propionate
Et.—Ethyl radical
Et.⁺—Ethyl carbonium ion A silver catalyst was used in examples VII-A, -B and -C to increase the ethyl radical yield.

Example VII-A shows the effect of sulfate ions on the ethyl radicals. Some ethanol is made. Presumably the ethyl carbonium ion-copper sulfate complex yields some ethyl sulfate which hydrolyzes to ethanol (equation 29B). Only 6.9 percent of the carbonium complex yields ethyl sulfate. The remainder is deprotonated to ethylene (equation 28A Example VII-B shows that phosphate ions have an effect very similar to sulfate ions. The ethyl phosphate intermediate would hydrolyze to ethanol. Only 4.0 percent of the carbonium ion is substituted. Example VII-C shows that perchlorate ions show only 2.8 percent substitution of the carbonium ion. Example VII-D shows that the carbonium copper chloride complex is 68.7 percent converted to ethyl chloride plus ethanol. The major substitution product is the chloride by a ratio of 16 to 1.

Example VII–E shows that the carbonium copper hydroxide complex is 53 percent converted to ethanol. In this run on the alkaline side only 20 percent of the ethyl radical passed through the copper salt-carbonium ion complex. In the others, the value averaged between about 36 and about 55 percent.

EXAMPLE VIII

This example shows the products obtained by the oxidation of ions other than acetic or propionic by potassium persulfate.

TABLE VIII

| Example | VIII–A | VIII–B | VIII–C | VIII–D | VIII–E | VIII–F |
|---|---|---|---|---|---|---|
| Reactants, moles: | | | | | | |
| $K_2S_2O_8$ | 0.020 | 0.20 | 0.06 | 0.08 | 0.020 | 0.020 |
| HCOONa | 0.12 | | | | | |
| HCOOH | 0.020 | | | | | |
| $H_2O$ | 5.5 | 8.8 | 24 | 24 | 8.5 | 11 |
| $C_3H_5COOH$ | | 0.50 | | | | |
| $(CH_2COOH)_2$ | | | 0.20 | | | |
| Adipic acid | | | | 0.20 | | |
| KCN | | | | | 0.078 | |
| $H_2SO_4$ | | | | | 0.050 | |
| t-$C_4H_9OH$ | | | | | | 0.32 |
| Catalyst, moles: | | | | | | |
| $Ag^+$ | | 0.007 | 0.014 | 0.014 | 0.0036 | |
| $Cu^{++}$ | | | 0.010 | 0.010 | | |
| Time, minutes | $t_{1/2}$=5 | 30 | 120 | 80 | 120 | 70 |
| Temperature, °C | 56 | 100 | 100 | 100 | 100 | 83 |
| Cc. of solution | 110 | 200 | 500 | 500 | 150 | 230 |
| Batch or slow addition | Batch | Slow | Slow | Slow | Slow | Slow |
| Products, mole/mole $K_2S_2O_8$: | | | | | | |
| $CO_2$ | 0.575 | 2.200 | 1.033 | 0.990 | 0.100 | |
| $CH_4$ | | 0.000 | 0.000 | | | 0.30 |
| $C_2H_6$ | | 0.075 | | | | |
| $C_2H_4$ | | 0.025 | 0.067 | | | |
| $C_3H_8$ | | 1.250 | | | | |
| $CH_2=CH-COOH$ | | | 0.04 | | | |
| $CH_3·CH_2·COOH$ | | | 0.10 | | | |
| Butadiene | | | | 0.004 | | |
| $C_5$ acids | | | | 0.450 | | |
| $(CN)_2$ | | | | | 0.500 | |
| i-$C_4H_8$ | | | | | | 0.15 |
| $CH_3·CO·CH_3$ | | | | | | 1.66 |

Example VIII–A shows that formic acid is oxidized to carbon dioxide. Example VIII–B shows that butyric acid yields propylene. The ethane and ethylene were not expected. Example VIII–C shows the products expected from the postulated $CH_2·CH_2·COOH$ intermediate radical. They are acrylic acid by deprotonation and propionic acid by hydrogen abstraction. Example VIII–D shows the expected five carbon acids. They should be a mixture of 4-pentenoic acid and pentaneoic acid. In addition, some butadiene was observed. This would have been obtained by secondary oxidation of the pentenoic acid to the butene radical, $CH_2:CH_2.CH_2.CH_2·$, and deprotonation of this radical to butadiene. Example VIII–E shows that hydrogen cyanide (in the presence of excess sulfuric acid potassium cyanide gives cyanogen) is oxidized to cyanogen in 50 percent of theoretical yield. Example VIII–F shows that tertiary butyl alcohol is oxidized to acetone and methane. This is explained on the basis of a tertiary-butoxy intermediate radical (equations 1, 18, and 19).

It will be understood, of course, by those skilled in the art that the present invention is not limited only to the specific ingredients, proportions thereof, time, temperature and other conditions of reaction that have been given in the foregoing examples and detailed description by way of illustration. For instance, instead of potassium persulfate one may use any other alkali-metal persulfate or ammonium persulfate, or the corresponding percarbonates or perphosphates, or the corresponding available peracids. Likewise, other organic acids, salts of organic acids, tertiary alcohols, nitriles, catalysts and other additives including other reactants may be used in lieu of or in addition to those employed in the individual examples. Numerous examples of such other components have been given hereinbefore.

As has been stated previously, the process of this invention does not include the use of hydrogen peroxide or organic peroxides or hydroperoxides as the peroxy compound which could be employed. The reason for this is that these peroxy compounds tend to form radicals which preferentially reaction with themselves rather than with the nonperoxy organic reactants present. For example hydrogen peroxide forms hydroxyl radicals which preferentially react with additional hydrogen peroxide to form oxygen and water rather than with an organic reactant to form intermediate organic radicals capable of further reacting to form organic products.

It is to be understood that the foregoing detailed description is given merely by way of illustration and that many variations may be made therein without departing from the spirit of our invention.

I claim:

1. In the art of organic chemical synthesis involving chemically reactive material including essentially at least one organic reactant which is free from aliphatic unsaturation, is capable of yielding free organic radicals under free radical-forming conditions, and is selected from the group consisting of tertiary alcohols, organic acids and salts of organic acids, the improvement which consists in evolving from said organic reactant free organic radicals by oxidizing said organic reactant in a liquid medium comprising water, under free radical-forming conditions with at least one peroxy compound selected from the group consisting of (a) peroxy acids represented by the general formula A·O·O·A' where A and A' each represents a member of the group consisting of (HO)$_2$·PO·, HO·(CO)· and HO·(SO$_2$)·, and (b) salts of the peroxy acids of (a); said peroxy compound being added to the reaction zone such that its concentration never exceeds one-third that which would result from batchwise addition of all the peroxy compound utilized; and allowing the said evolved organic radicals to enter into an electron pairing reaction with a coreactant which is a compound having in the molecule a moiety having electron pairing propensities.

2. The improvement as in claim 1 wherein the peroxy compound is a salt of the peroxy acid of (a) said salt being at least partly soluble in water.

3. The improvement as in claim 1 wherein the peroxy compound is an alkali-metal persulfate.

4. The improvement as in claim 3 wherein the alkali-metal persulfate is potassium persulfate.

5. The improvement as in claim 1 wherein the organic reactant is tertiary butanol.

6. The improvement as in claim 1 wherein the organic reactant comprises a saturated aliphatic carboxylic acid.

7. The improvement as in claim 1 wherein the organic reactant comprises a salt of a saturated aliphatic carboxylic acid.

8. The improvement as in claim 1 wherein the organic reactant is oxidized in the presence of a catalyst comprising at least one metallic ion.

9. The improvement as in claim 8 wherein the metallic ion comprises a copper ion.

10. The improvement as in claim 8 wherein the catalyst comprises both a copper ion and a silver ion.

11. The improvement as in claim 1 wherein, said member of said group is a salt.

12. The improvement as in claim 11 wherein, in addition to said salt, there is also employed the acid corresponding to said salt.

13. In the art of organic chemical synthesis involving at least two different chemically reactive materials, one of which is HCN and another of which comprises a monocarboxy compound that contains at least two carbon atoms, is free from aliphatic unsaturation and is capable of yielding free hydrocarbon radicals under free radical-forming conditions, the improvement which consists in evolving free hydrocarbon radicals from said monocarboxy compound by oxidizing said compound under free radical-forming conditions in an aqueous medium containing a water-soluble persulfate; and isolating from the reaction mass a nitrile corresponding to the hydrocarbon radicals evolved.

14. The improvement as in claim 13 wherein the monocarboxy compound comprises acetic acid, the water-soluble persulfate is potassium persulfate, and the isolated nitrile is acetonitrile.

15. The method of producing a ketone which comprises oxidizing a tertiary alkanol by bringing it into reactive relationship in a liquid medium comprising water with at least one peroxy compound selected from the group consisting of (a) peroxy acids represented by the general formula A·O·O·A' where A and A' each represents a member of the group consisting of $(HO)_2 \cdot PO \cdot$, $HO \cdot (CO) \cdot$ and $HO \cdot (SO_2) \cdot$, and (b) salts of the acids of (a).

16. The method of producing acetone which comprises oxidizing tertiary butanol with a water-soluble persulfate in an aqueous medium.

17. The method which comprises oxidizing an acid represented by the general formula H·X where X is a member of the group consisting of ·Cl, ·Br and ·CN together with an organic acid or salt of an organic acid said reactants yielding .X and .R radicals respectively under free-radical forming conditions by bringing said acids into reactive relationship in a liquid medium comprising water with at least one peroxy compound selected from the group consisting of (a) peroxy acids represented by the general formula A·O·O·A' where A and A' each represents a member of the group consisting of $(HO)_2 \cdot PO \cdot$, $HO \cdot (CO) \cdot$, and $HO \cdot (SO_2) \cdot$, and (b) salts of the acids of (a) to form said radicals which combine to form a product comprising RX.

18. The method of producing cyanogen which comprises oxidizing HCN with a water-soluble persulfate in an aqueous medium.

19. The method of producing cyanogen which comprises oxidizing HCN with a water-soluble persulfate in an aqueous medium containing copper ions as a catalyst for the reaction.

* * * * *